United States Patent
Molloy (10) Patent No.: US 12,515,775 B2
(45) Date of Patent: Jan. 6, 2026

(54) SYSTEM AND METHOD OF HYBRID MARINE PROPULSION

(71) Applicant: Glas Ocean Electric Inc., Halifax (CA)

(72) Inventor: Sue Molloy, Halifax (CA)

(73) Assignee: Glas Ocean Electric Inc., Halifax (CA)

( * ) Notice: Subject to any disclaimer, the term of this patent is extended or adjusted under 35 U.S.C. 154(b) by 668 days.

(21) Appl. No.: 17/773,450

(22) PCT Filed: Oct. 28, 2020

(86) PCT No.: PCT/CA2020/051450
§ 371 (c)(1),
(2) Date: Apr. 29, 2022

(87) PCT Pub. No.: WO2021/081645
PCT Pub. Date: May 6, 2021

(65) Prior Publication Data
US 2022/0411033 A1    Dec. 29, 2022

Related U.S. Application Data

(60) Provisional application No. 62/927,499, filed on Oct. 29, 2019.

(51) Int. Cl.
*B63H 21/17* (2006.01)
*B63H 21/14* (2006.01)
(Continued)

(52) U.S. Cl.
CPC ........... *B63H 21/213* (2013.01); *B63H 21/14* (2013.01); *B63H 21/17* (2013.01); *B63H 23/34* (2013.01); *B63H 2021/216* (2013.01)

(58) Field of Classification Search
CPC ...... B63H 21/213; B63H 21/14; B63H 21/17; B63H 23/34; B63H 2021/216; B63H 2021/202; B63B 21/20; F01M 2001/0215
See application file for complete search history.

(56) References Cited

U.S. PATENT DOCUMENTS

| 3,650,345 A | 3/1972 | Yardney |
| 4,273,543 A | 6/1981 | McCusker |

(Continued)

FOREIGN PATENT DOCUMENTS

| CN | 203127132 U | 8/2013 |
| CN | 104037927 A | 9/2014 |

(Continued)

OTHER PUBLICATIONS

International Search Report and Written Opinion mailed Feb. 3, 2021 in related Patent Application No. PCT/CA2020/051450 (8 pages).

*Primary Examiner* — Andrew Polay
(74) *Attorney, Agent, or Firm* — Smart & Biggar LP (57) ABSTRACT

A marine propulsion system, comprising a drive shaft secured to a propeller to rotationally drive the propeller; a motor selectively coupled to the drive shaft to rotate the drive shaft; an electrical energy storage unit coupled to the motor to supply an on-board electrical power supply to the motor, the electrical energy storage unit configured to be recharged by an on-shore electrical power supply; an engine selectively coupled to the drive shaft to rotate the drive shaft, the engine not coupled to the electrical energy storage unit for use as a generator to recharge the electrical energy storage unit; and a control system coupled to the motor and to the engine for selecting one of the motor and the engine to rotate the drive shaft. A hybrid marine propulsion method, comprising rotationally driving a drive shaft and propeller using an engine; shifting the engine into neutral; turning on an electric motor by manually activating a motor toggle; disengaging the engine from rotational driving engagement with the drive shaft and engaging the electric motor in rotational driving engagement with the drive shaft; and (Continued)

turning on a fluid sub-system to supply fluid to the drive shaft by manually activating a fluid sub-system toggle.

20 Claims, 5 Drawing Sheets

(51) Int. Cl.
*B63H 21/21* (2006.01)
*B63H 23/34* (2006.01)

(56) References Cited

U.S. PATENT DOCUMENTS

| | | | |
|---|---|---|---|
| 5,863,228 A | 1/1999 | Tether | |
| 7,621,789 B2 | 11/2009 | Mizokawa | |
| 8,682,516 B1 | 3/2014 | Balogh et al. | |
| 8,727,820 B2 | 5/2014 | Stasolla | |
| 2012/0101671 A1* | 4/2012 | Caouette | B63H 21/21 |
| | | | 180/65.265 |
| 2018/0312236 A1* | 11/2018 | Miyamae | B63H 23/12 |
| 2019/0382091 A1* | 12/2019 | Borich | B63H 5/125 |

FOREIGN PATENT DOCUMENTS

| | | |
|---|---|---|
| JP | 201225250 A | 2/2012 |
| KR | 1020180017568 A | 2/2018 |

* cited by examiner

SYSTEM AND METHOD OF HYBRID MARINE PROPULSION

CROSS-REFERENCE TO RELATED APPLICATIONS

This application is a U.S. national phase entry of PCT/CA2020/051450, filed Oct. 28, 2020, which claims the benefit of priority to U.S. Provisional Application No. 62/927,499, filed Oct. 29, 2019, the contents of each of which are incorporated herein by reference in their entirety.

TECHNICAL FIELD

The described embodiments relate to marine propulsion, particularly to parallel diesel engine and electric motor propulsion.

BACKGROUND

U.S. Pat. No. 4,273,543 purports to disclose an emergency propulsion system for both motor powered and sailing vessels which have a single propeller shaft. A small diesel engine that is used to provide electrical generation is also selectively employed to turn a hydrostatic pump and then through a fluid connected means drives a hydrostatic motor which drives a V-belt to the propeller shaft. The hydrostatic pump is operatively driven by the diesel engine but the motor is operatively connected to the propeller shaft only after the disabled main engine is disconnected from the propeller shaft.

U.S. Pat. No. 5,863,228 purports to disclose an auxiliary propulsion system for a boat or other marine vessel incorporating an electric motor/transmission device for generating locomotive force to propel the boat or vessel, an electrical power supply for providing electrical energy to drive the electric motor/transmission device, at least one electrical energy generating device for generating electrical energy through conversion from one of at least sunlight, wind motion and water motion, a charging circuit having a device for controlling charging of the power supply with electrical energy from the energy generating device, and a device for controlling speed and direction operation of the electric motor/transmission device. In operation, electrical energy is inputted into the electric motor/transmission device from the electrical power supply and locomotive force is thereby generated by the electric motor/transmission device when the primary propulsion system of the boat or other marine vessel is inactive. Electrical energy to be stored in the electrical power supply is generated by converting at least one of sunlight, wind motion and water motion into electrical energy.

U.S. Pat. No. 8,682,516 purports to disclose a hybrid marine propulsion system including a marine propulsor that propels a marine vessel; an internal combustion engine that selectively powers the marine propulsor; an electric motor that selectively powers the marine propulsor; a controller that controls operation of the internal combustion engine and the electric motor according to a plurality of modes including an engine mode wherein the engine alone powers the marine propulsor and a boost mode wherein the engine and the electric motor together power the marine propulsor; and a user input device that inputs a user initiated command to the controller to thereby change control from the engine mode to the boost mode. Upon input of the user-initiated command, the controller can maintain an existing output of the internal combustion engine such that the power provided by the electric motor is added to the power already being provided by the internal combustion engine.

SUMMARY

According to some aspects, there is provided a marine propulsion system, comprising a drive shaft secured to a propeller to rotationally drive the propeller; a motor selectively coupled to the drive shaft to rotate the drive shaft; an electrical energy storage unit coupled to the motor to supply an on-board electrical power supply to the motor, the electrical energy storage unit configured to be recharged by an on-shore electrical power supply from an on-shore electrical power source; an engine selectively coupled to the drive shaft to rotate the drive shaft, the engine not coupled to the electrical energy storage unit for use as a generator to recharge the electrical energy storage unit; and a control system coupled to the motor and to the engine for selecting one of the motor and the engine to rotate the drive shaft.

In some embodiments, a marine propulsion system further comprises a fluid sub-system to supply fluid to the drive shaft when the drive shaft is rotated by the motor.

According to some aspects, there is provided a hybrid marine propulsion method, comprising rotationally driving a drive shaft and propeller using an engine; shifting the engine into neutral; turning on an electric motor by manually activating a motor toggle; disengaging the engine from rotational driving engagement with the drive shaft and engaging the electric motor in rotational driving engagement with the drive shaft; and turning on a fluid sub-system to supply fluid to the drive shaft by manually activating a fluid sub-system toggle.

In some embodiments, a hybrid marine propulsion method further comprises using a joystick to control the motor.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

In some embodiments, a diesel engine is coupled in parallel with a direct current motor via a belt and sprocket system, allowing for either the DC motor or engine to drive the propeller. In such embodiments, a clutch/gearbox is used with the DC motor to allow the drive shaft to rotate at a similar speed as the diesel engine. The clutch/gearbox may also function to isolate the DC motor from the drive shaft while the diesel engine is running.

Figure 1:
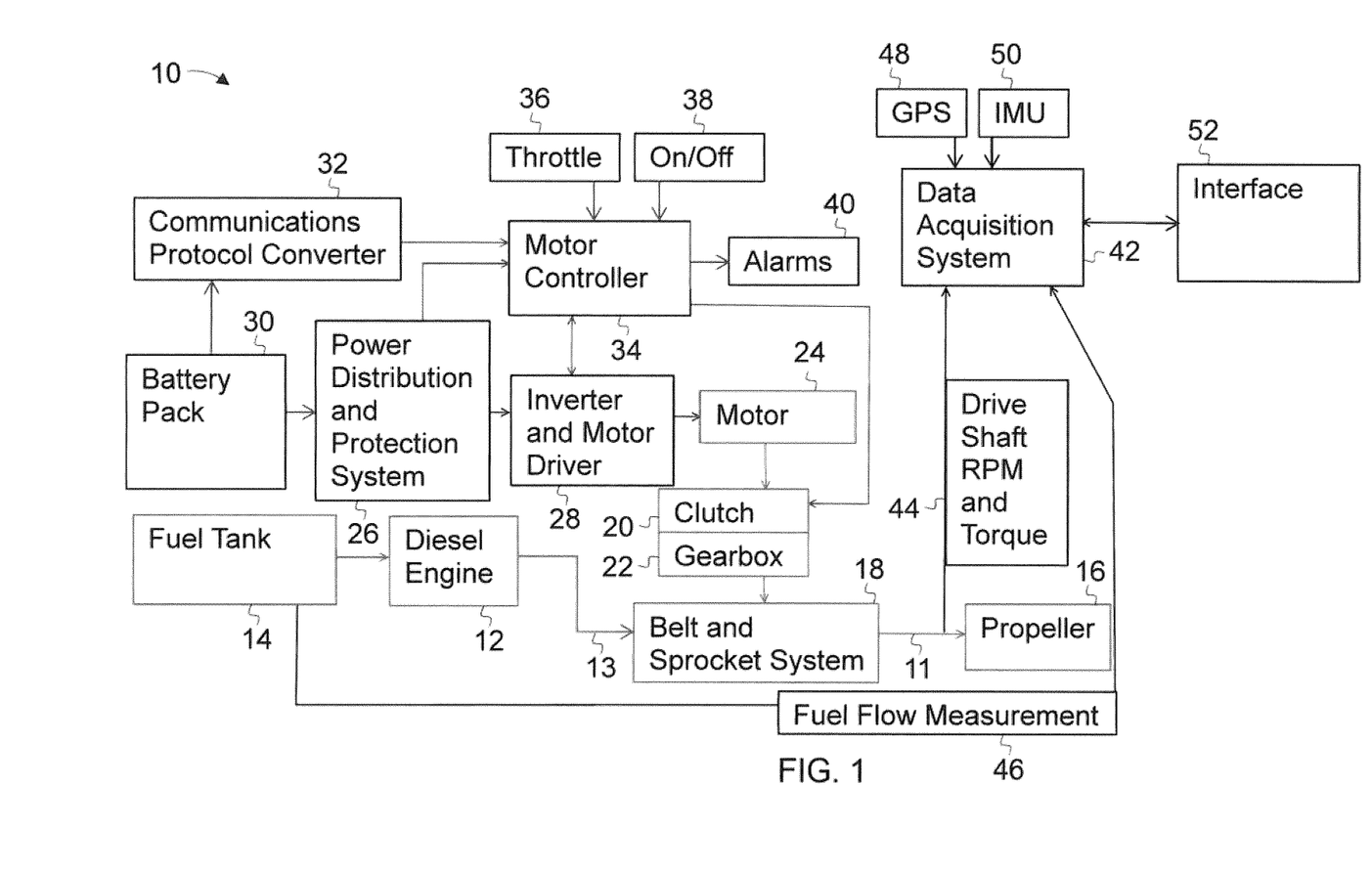
FIG. 1 is a schematic drawing of a hybrid propulsion system, according to an embodiment.

Referring to FIG. 1, an example of a hybrid marine propulsion system 10 is illustrated. Hybrid marine propulsion system 10 includes a drive shaft 11 secured to a propeller 16 to rotationally drive the propeller 16. An electric motor 24 is selectively coupled to the drive shaft 11 to rotate the drive shaft 11 and an electrical energy storage unit 30 is coupled to the motor 24 to supply an on-board electrical power supply to the motor. The electrical energy storage unit 30 is configured to be recharged by an on-shore electrical power supply from an on-shore electrical power source (not shown). The electrical energy storage unit 30 may be for example a battery pack or capacitor.

Hybrid marine propulsion system 10 also includes an engine 12 selectively coupled to the drive shaft 11 to rotate the drive shaft 11. The engine 12 is not coupled to the electrical energy storage unit 30 for use as a generator to recharge the electrical energy storage unit 30. Coupling the engine 12 to the energy storage unit to recharge the electrical energy storage unit may increase the complexity of the system and/or result in the use of engine 12 at sub-optimal operational efficiency when power generated at higher efficiencies is available from on-shore sources. Charging the energy storage unit 30 only from an on-shore electrical power supply may improve the overall efficiency of the hybrid marine propulsion system.

Hybrid marine propulsion system 10 also includes a control system coupled to the motor and to the engine for selecting one of the motor and the engine to rotate the drive shaft. In the illustrated embodiment the control system includes a motor controller 34 to receive on or off input from an on/off toggle 38 and throttle input from a throttle toggle 36. Motor controller 34 directs the inverter and motor driver 28 to control motor 24. The inverter and motor driver 28 is used in some embodiments to modify input energy supply to meet the needs of motor 24, such as to change between direct and alternating current and to amplify low current signals. Motor controller 34 also receives information, such as control and/or diagnostic information, from electrical energy storage unit 30, through communications protocol converter 32 if necessary. For example, converter 32 may be a Modbus/can protocol converter. Motor controller 34 may also generate alarms 40 in some circumstances, such as if motor controller 34 is supplied through converter 32 with information that unit 30 is low on charge. The control system of hybrid marine propulsion system 10 also includes an engine controller (not shown) controlling the operation of engine 12.

Hybrid marine propulsion system 10 includes a power distribution and protection system 26 to protect the system from overcurrent scenarios and to provide power for the inverter 28. Motor controller 34 may also receive power from the electrical energy storage unit 30 through the power distribution and protection system 26. Power distribution and protection system 26 may be a fused system, with fuses connected between unit 30 and inverter 28 so that in an overcurrent scenario the fuses will blow. Power distribution and protection system 26 may also send diagnostic information to motor controller 34, such as current and/or voltage measurements. Power distribution and protection system 26 may also provide power to electrical subsystems, such as pumps and any other miscellaneous equipment aboard the marine vessel.

In some embodiments, the motor controller 34 effectively ramps the voltage up and down to ease the motor 24 on and off. This may be programmed in the inverter 28. For example, this may prevent large inrush currents due to accelerating from standstill or decelerating from nominal velocity, such as due to an operator of a boat moving a throttle from neutral to full forward/backward, full forward/backward to neutral, or full forward/backward to full backward/forward.

The control system may also be used to turn of whichever of the motor 24 and engine 12 is not being used to drive the drive shaft 11. For example, if the motor 24 is running and engaged with drive shaft 11 through clutch 20, the engine 12 may be turned off and disengaged from drive shaft 11 through a clutch system (not shown) so as to be kept isolated from motor 24.

A hybrid system, such as one having an electric motor and a diesel engine in parallel, may allow for the use of a diesel engine during high-power operations and an electric motor during low-power operations so as to significantly reduce high-emissions operations at times of low engine efficiency. Certain industries require short periods of high-power operations such as rapid travel, interspaced by periods of low-power operations such as slow travel. Many engines are not efficient during periods of low-power operations, and an electric motor may be more efficient, particularly if the electric motor is charged from shore and not by an engine operating at a low efficiency.

Engine 12 receives fuel from fuel tank 14 and is coupled to drive shaft 11, such as through an output shaft 13 and clutch system (not shown). Motor 24 is also coupled to drive shaft 11, and is coupled through a clutch 20. Motor 24 may be disengaged from drive shaft 11 when clutch 20 is released by motor controller 34. When clutch 20 is engaged, motor 24 may rotationally drive the drive shaft 11, such as through a belt and sprocket system 18 joining the gearbox 22 to the drive shaft 11.

When engine 12 is running, engine 12 may also control transmission or other fluid where needed, such as to one or more of an engine transmission system (not shown), drive shaft 11 to lubricate drive shaft 11, and gearbox 22. When engine 12 is disengaged and turned off, a fluid sub-system (not shown) may be engaged to supply and pump fluid where needed, such as to the drive shaft and gearbox 22 when the drive shaft is rotated by the motor. In some embodiments, engine 12 may disengage or even turn off, and so may not be available to control fluid flow to where it is needed. A fluid sub-system may include at least one pump, such as an electric pump supplied by unit 30, and in some embodiments may be controlled by motor controller 34. In some embodiments a fluid sub-system pump may be part of motor 24 or may be driven by motor 24.

Hybrid marine propulsion system 10 also includes a data acquisition system 42 which receives information from various parts of system 10 and interfaces with an operator through interface 52. For example, interface 52 may be a touchscreen, a speaker, or a screen and a keyboard. In some embodiments, system 42 may transmit data to a computer using a wireless connection so that the computer may be used to access real time information and driving data for the marine vessel such as predicted fuel savings when operating as an electric boat, various efficiency metrics, etc. Data acquisition system 42 may collect fuel flow measurements 46 from fuel tank 14 and drive shaft revolutions per minute (RPM) and torque data 44 from drive shaft 11. Data acquisition system 42 may collect global positioning system (GPS) data from a GPS unit 48 and inertial measurement data from an inertial measurement unit (IMU) 50. For example, IMU could be to predict wave activity and how that affects energy consumption.

Data acquisition system 41 may be, for example, an M3 data acquisition system designed to receive data from a boat system, drive shaft torque, drive shaft rpm, IMU data, GPS, and fuel flow. It may output data to a human machine interface application, which may use the data to display various metrics for the boat operation in real time.

In some embodiments, energy storage unit 30 may be used as a dynamic energy storage unit for a power grid. For example, a shore-based power grid may generate excess electricity at a time when a marine vessel holding energy storage unit 30 is docked and coupled to the shore-based power grid, making the unit 30 available to hold excess electricity which may in some cases by retrieved by the power grid later on. Unit 30 or a plurality of units 30 may form a dynamic storage for a power grid which grows or shrinks based on vessel usage, and which consumes at least part of the power stored thereon.

Figure 2:
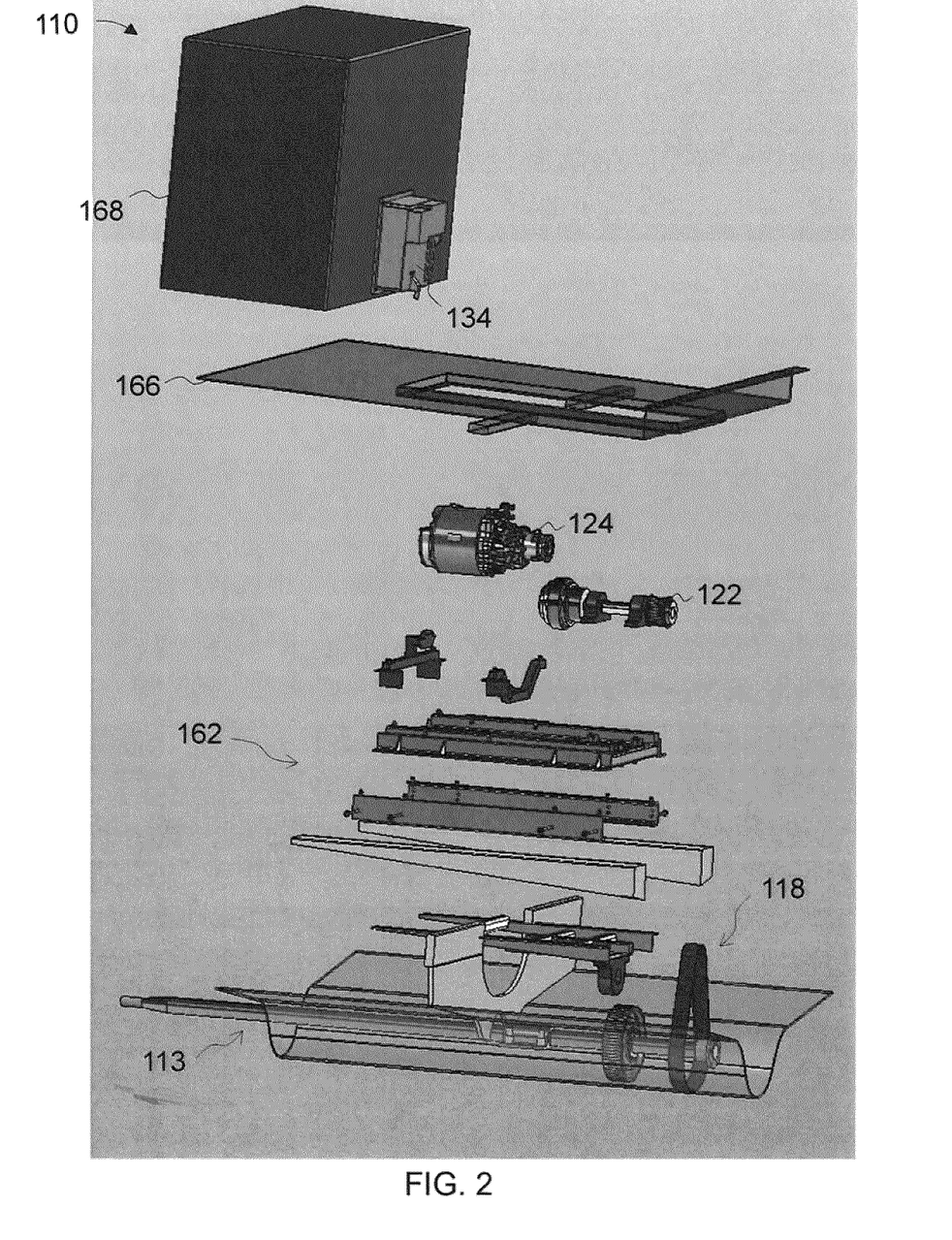
FIG. 2 is a perspective exploded view of a hybrid propulsion system, according to an embodiment.

With reference to FIG. 2, another example of a hybrid marine propulsion system 110 is illustrated. The hybrid marine propulsion system 110 is similar in many respects to the hybrid marine propulsion system 10, and like features are identified by like reference characters, incremented by 100.

Hybrid marine propulsion system 110 includes a battery box 168 housing a battery (not shown) and mounted on a deck 166 of a marine vessel. Motor controller 34 is mounted above deck 166 for easy physical access for manual control, and in the illustrated example is mounted on battery box 168. Motor 124 and gearbox 122 are shown and are mounted below deck 166 and held between the deck 166 and hull by a motor seat and support frame 162. Motor 124 is joined to drive shaft 111 by belt and sprocket system 118. Engine output shaft 113 is also joined to drive shaft 111.

Figure 3:
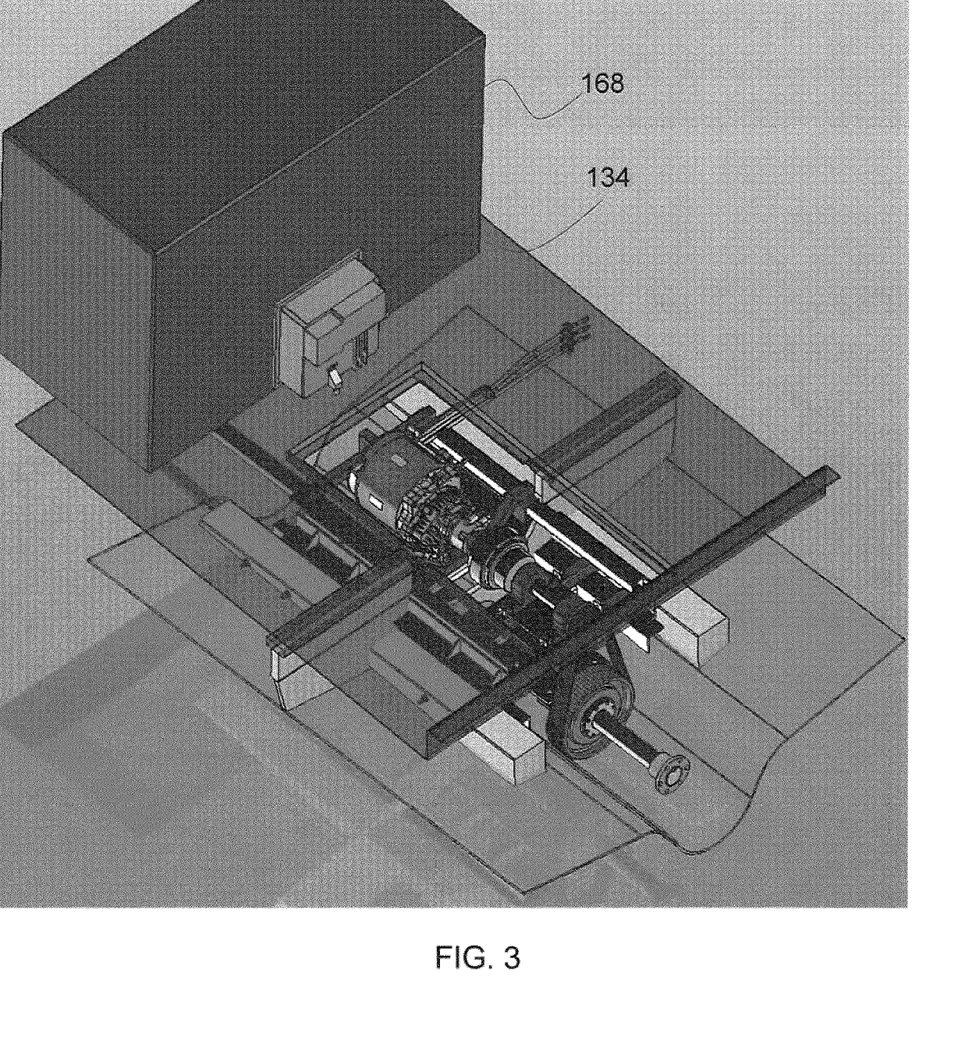
FIG. 3 is a top perspective view of the hybrid propulsion system of FIG. 2.
Figure 4:
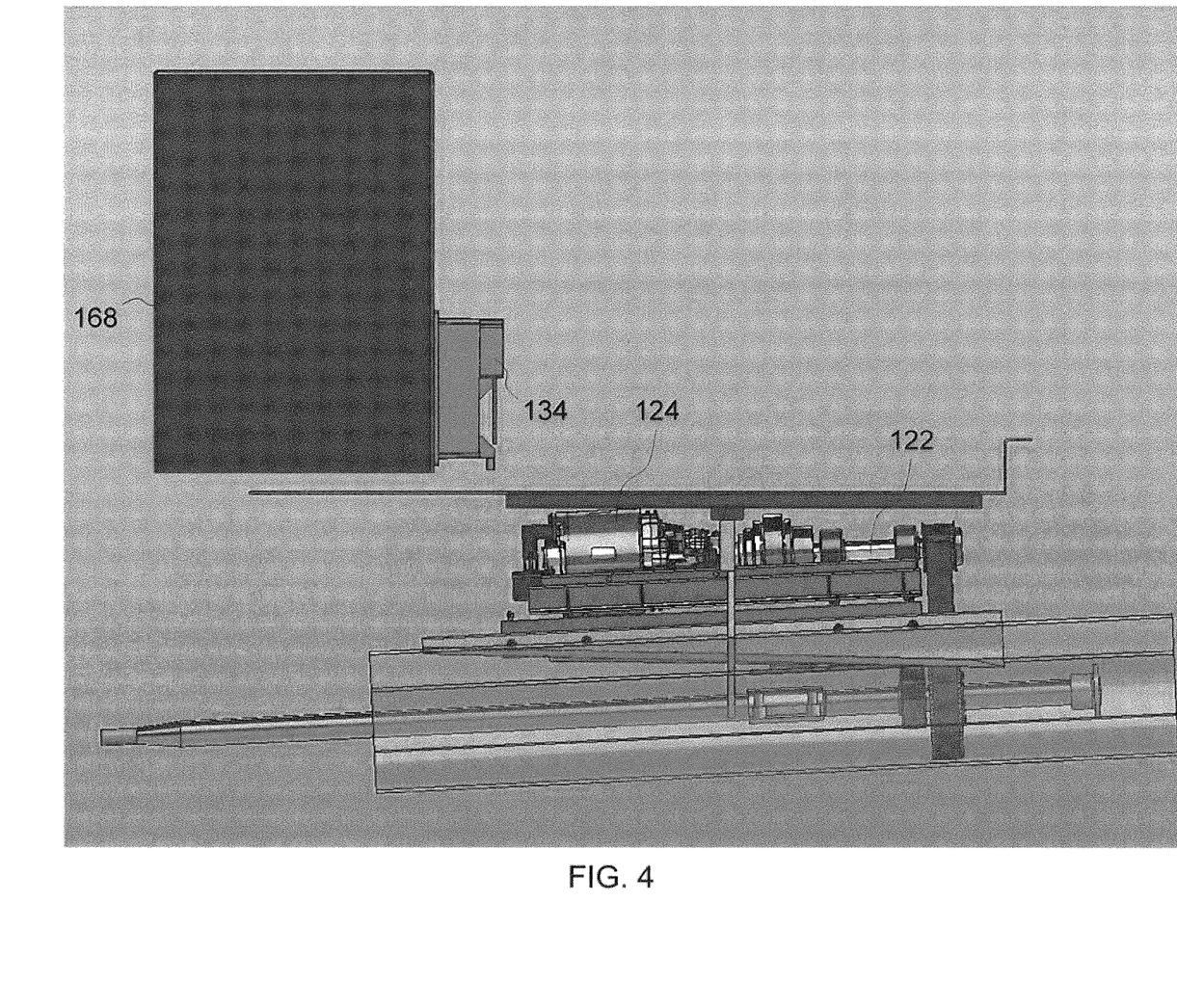
FIG. 4 is a side elevation view of the hybrid propulsion system of FIG. 2.
Figure 5:
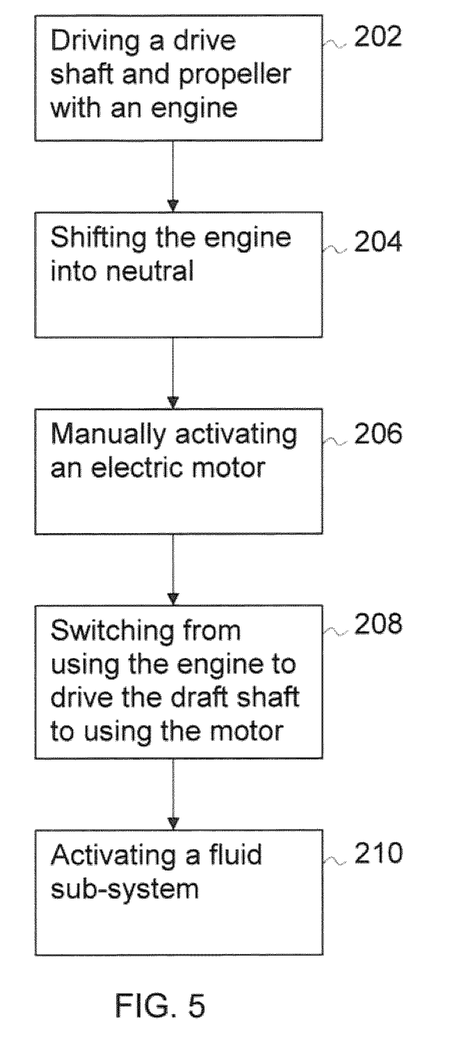
FIG. 5 is a flow chart of a method of hybrid propulsion, according to an embodiment.

With reference to FIG. 3, a method of hybrid marine propulsion is illustrated. In some marine vessels such as small fishing craft, manually activated toggles may be preferred. For example, manually activated toggles may improve safety, security, or override options, or may simplify and improve the reliability of the system. Some operators of marine craft may also be accustomed to pulling levers.

In the illustrated method, an operator of a marine vessel engages an engine in rotational driving engagement with a drive shaft at step 202, such as for high-power operations. For low-power operations the operator then shifts the engine into neutral at step 204 and turns the engine off, turns on an electric motor at step 206, the motor powered by a shore-charged battery, and disengages the engine from rotational driving engagement with the drive shaft and engages the motor in rotational driving engagement with the drive shaft at step 208. During engine engagement, fluid flow may be controlled by the engine, however during motor engagement the operator may also turn on a fluid sub-system to control fluid flow at step 210. One or more actions may be taken by an operator by manually activating a toggle. When the motor is engaged the operator may also control the motor by manually manipulating a joystick or other control to which many marine vessel operators have grown accustomed.

While the above description provides examples of one or more apparatus, methods, or systems, it will be appreciated that other apparatus, methods, or systems may be within the scope of the claims as interpreted by one of skill in the art.

The invention claimed is:

1. A marine propulsion system, comprising:
   a drive shaft secured to a propeller to rotationally drive the propeller;
   an electric motor selectively coupled to the drive shaft to rotate the drive shaft;
   an electrical energy storage unit coupled to the electric motor to supply an on-board electrical power supply to the electric motor, the electrical energy storage unit configured to be recharged by an on-shore electrical power supply from an on-shore electrical power source;
   an engine selectively coupled to the drive shaft to rotate the drive shaft, the engine not coupled to the electrical energy storage unit for use to recharge the electrical energy storage unit, and the engine operable to control a flow of a fluid to the drive shaft when the drive shaft is rotated by the engine;
   a fluid sub-system including a pump, the fluid sub-system operable to control the flow of the fluid to the drive shaft when the drive shaft is rotated by the motor; and
   a control system coupled to the electric motor and to the engine for selecting one of the motor and the engine to rotate the drive shaft, and the control system coupled to the fluid sub-system to control the fluid sub-system whereby the fluid subsystem is turned on control the flow of the fluid to the drive shaft when the engine is disengaged from the drive shaft.

2. The system of claim 1, further comprising a data acquisition system to receive data from one or more of the motor, the engine, the drive shaft, and the energy storage unit.

3. The system of claim 2, further comprising a user interface coupled to the data acquisition system to present real-time data to a user.

4. The system of claim 3, further comprising a global positioning unit and an inertia measurement unit each coupled to the data acquisition system to supply data to the data acquisition system.

5. The system of claim 1, wherein at least one of the motor and the engine is manually controllable via one or more of a physical throttle lever and a physical on-off switch.

6. The system of claim 5, wherein the physical throttle lever and physical on-off switch are located above a deck of a marine vessel.

7. A hybrid marine propulsion method, comprising:
   rotationally driving a drive shaft and propeller using an engine;
   shifting the engine into neutral;
   turning on an electric motor by manually activating a motor toggle;
   disengaging the engine from rotational driving engagement with the drive shaft and engaging the electric motor in rotational driving engagement with the drive shaft; and
   turning on a fluid sub-system to supply fluid to the drive shaft by manually activating a fluid sub-system toggle.

8. The method of claim 7, further comprising using a joystick to control the motor.

9. The system of claim 1, wherein the motor is selectively joined to the drive shaft via a belt and sprocket system.

10. The system of claim 9, wherein the motor overlies the drive shaft above the drive shaft and is selectively joined to the underlying drive shaft by the belt and sprocket system.

11. The system of claim 10, wherein the motor has a motor axis of rotation and the engine has an engine axis of rotation that is generally coaxial with the motor axis of rotation.

12. The system of claim 1, wherein the pump of the fluid sub-system is driven by the motor.

13. A marine vessel comprising a marine propulsion system, the marine propulsion system including:
- a drive shaft secured to a propeller to rotationally drive the propeller;
- an electric motor selectively coupled to the drive shaft to rotate the drive shaft;
- an electrical energy storage unit coupled to the electric motor to supply an on-board electrical power supply to the electric motor, the electrical energy storage unit configured to be recharged by an on-shore electrical power supply from an on-shore electrical power source;
- an engine selectively coupled to the drive shaft to rotate the drive shaft, the engine not coupled to the electrical energy storage unit for use to recharge the electrical energy storage unit; and
- a control system coupled to the electric motor and to the engine for selecting one of the motor and the engine to rotate the drive shaft, and
- wherein the marine vessel and marine propulsion system are configured such that the electrical energy storage unit is only to be recharged by the on-shore electrical power supply.

14. The marine vessel of claim 13, further comprising a fluid sub-system to supply fluid to the drive shaft when the drive shaft is rotated by the motor, wherein when the engine is running the engine controls the fluid and when the engine is turned off the fluid sub-system is engaged to pump the fluid.

15. The marine vessel of claim 14, further comprising a manually activated fluid sub-system toggle whereby the fluid sub-system is operable to be manually engaged to pump the fluid to the drive shaft when the engine is disengaged.

16. The marine vessel of claim 14, wherein the fluid sub-system includes a pump to pump the fluid, and the pump is part of the motor.

17. The marine vessel of claim 14, wherein the fluid sub-system includes a pump to pump the fluid, and the pump is driven by the motor.

18. The marine vessel of claim 13, further comprising a data acquisition system to receive data from one or more of the motor, the engine, the drive shaft, and the energy storage unit.

19. The marine vessel of claim 18, further comprising a user interface coupled to the data acquisition system to present real-time data to a user.

20. The marine vessel of claim 18, further comprising a global positioning unit and an inertia measurement unit each coupled to the data acquisition system to supply data to the data acquisition system.

* * * * *